Sept. 22, 1959     E. M. BURNS     2,904,847
BLOWER
Filed Dec. 28, 1954     3 Sheets-Sheet 1
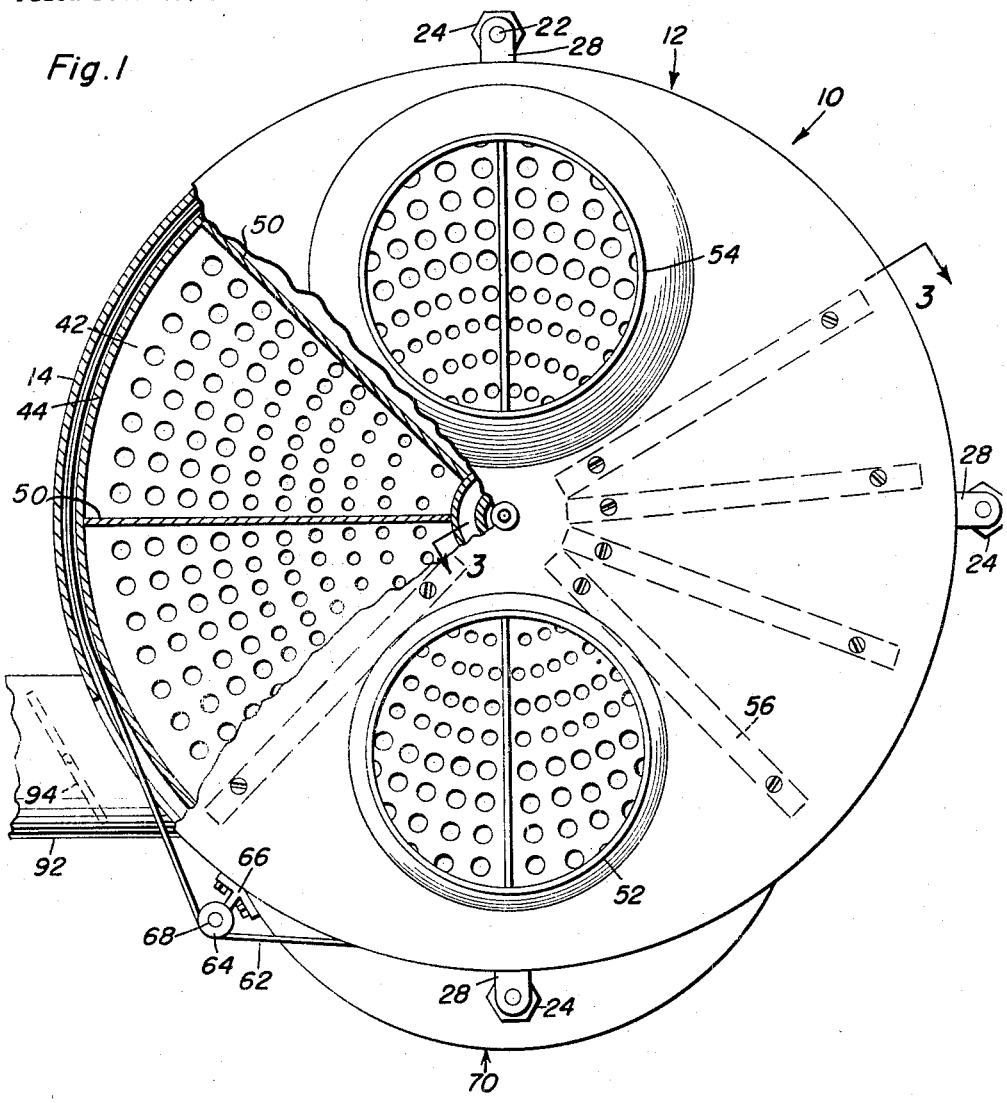
Fig. 1
Fig. 3
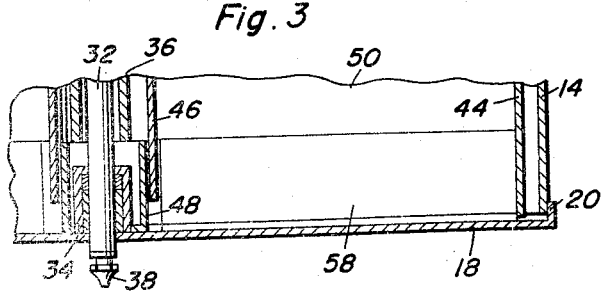
Edward M. Burns
INVENTOR.
BY *Clarence A. O'Brien*
*and Harvey B. Jacobson*
Attorneys Sept. 22, 1959 E. M. BURNS 2,904,847
BLOWER
Filed Dec. 28, 1954 3 Sheets-Sheet 2
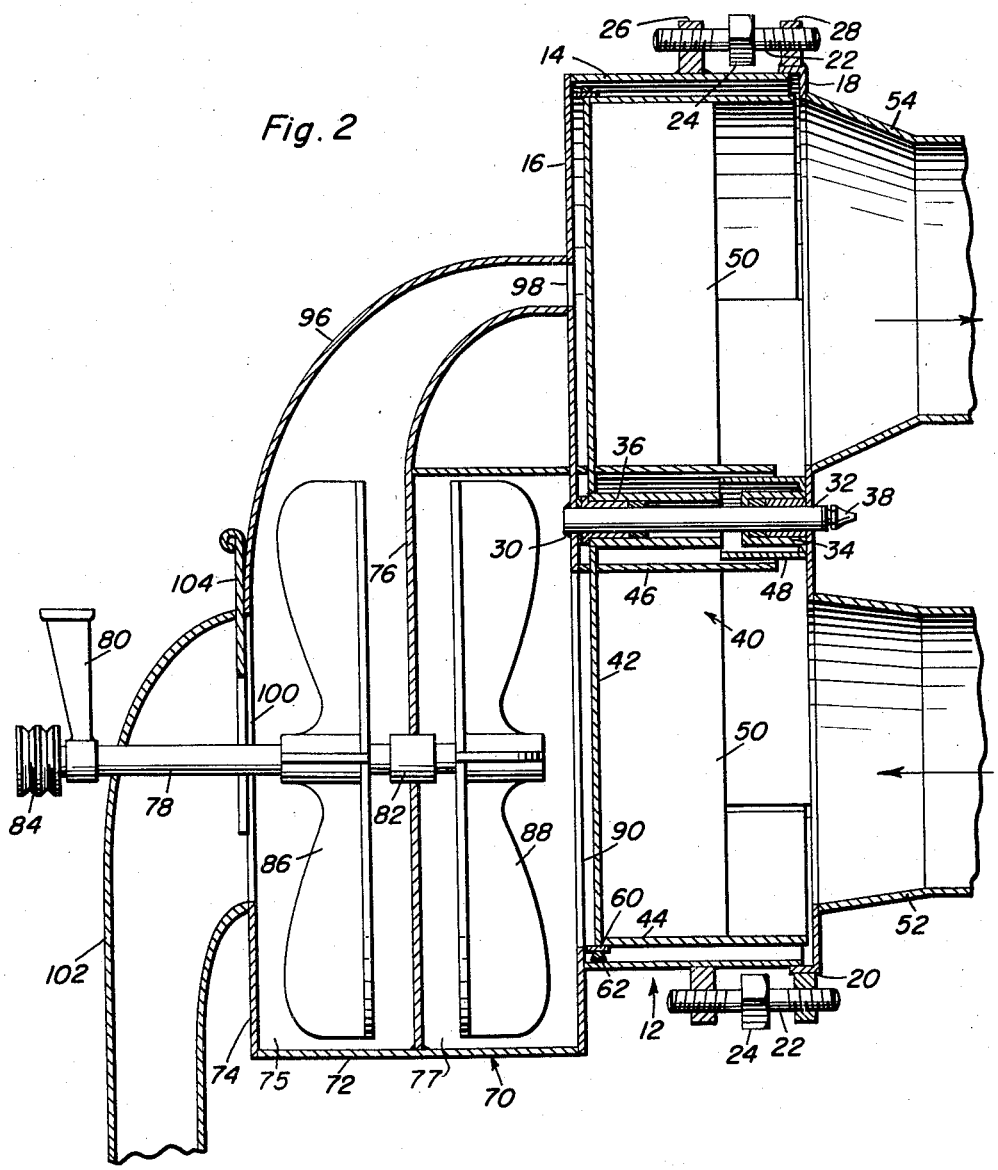
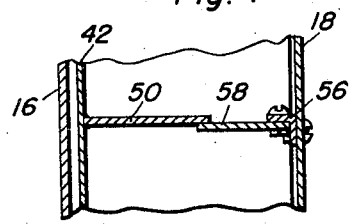
Edward M. Burns
INVENTOR.

Sept. 22, 1959      E. M. BURNS      2,904,847
BLOWER

Filed Dec. 28, 1954      3 Sheets-Sheet 3

Edward M. Burns
INVENTOR.

United States Patent Office 2,904,847
Patented Sept. 22, 1959

2,904,847

BLOWER

Edward M. Burns, Porterville, Calif.

Application December 28, 1954, Serial No. 478,126

5 Claims. (Cl. 19—72)

This invention relates in general to new and useful improvements in blower construction, and more specifically to an improved blower for use in conjunction with mechanical cotton pickers for separating trash from the cotton picked.

In order that cotton may be transferred from mechanical cotton pickers to cotton carriers of various types, there is normally provided a blower for blowing the cotton from the cotton picker to the cotton carrier. In view of this, it is the primary object of this invention to provide an improved blower which may be readily used in the transfer of cotton from a mechanical cotton picker to a cotton carrier, and at the same time, separate a majority of the trash from the cotton and the cottonseed.

Another object of this invention is to provide an improved blower intended to be used in conjunction with a mechanical cotton picker for transferring cotton therefrom to a cotton carrier, the blower being so constructed whereby the cotton is conditioned as it passes from the cotton picker to the cotton carrier.

By use of this invention, in conjunction with a mechanical cotton picker, for the purposes of transferring the cotton therefrom to a cotton basket or cotton carrier, located upon said mechanical picker, the dampness of the cotton or cottonseed will not interfere with its operation, as the damp cottonseed does not come in contact with the blower fan.

Still another object of this invention is to provide an improved blower which is intended to be used in conjunction with a mechanical cotton picker for the transfer of cotton therefrom, the blower requiring a suction in one part thereof and a pressure in another part thereof to effectively accomplish the desired purpose and being provided with separate air circulating means mounted on a single shaft.

A further object of this invention is to provide an improved blower for simultaneously transferring and conditioning cotton, the blower being so arranged whereby it may be connected to a tractor in such a manner whereby the warm air off the motor of the tractor may be utilized in the removing of excess moisture from the cotton.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of a preferred form of blower as it would appear when removed from a tractor and shows the general details thereof, a portion of a cover plate thereof being broken away in order to clearly show the details of a screen mounted for rotation within the housing of the blower;

Figure 2 is a longitudinal vertical sectional view taken through the center of the blower of Figure 1 and shows the specific arrangement of the fans thereof and the relationship to the various air passages of the blower;

Figure 3 is a fragmentary sectional view taken substantially upon the plane indicated by the section line 3—3 of Figure 1 and shows the relationship between a sealing flap carried by a cover plate of the blower housing and a partition wall of the screen member;

Figure 4 is a fragmentary sectional view showing further the relationship between the sealing flap and one of the separator walls;

Figure 5:
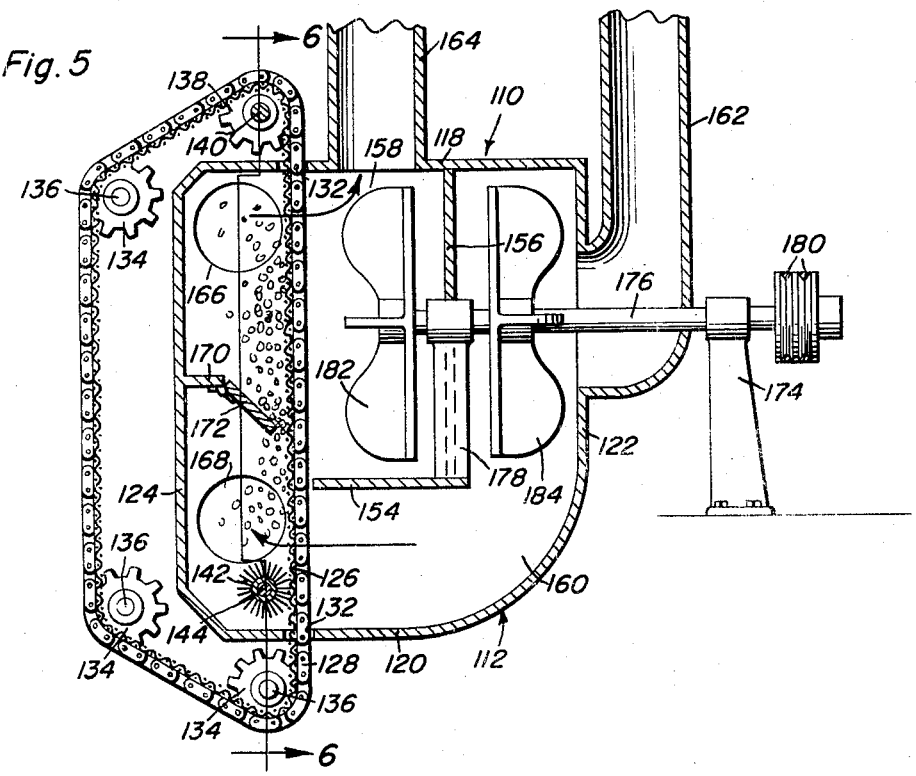
Figure 5 is a longitudinal vertical sectional view taken through a modified form of blower and shows the general details of the screen arrangement thereof.

Referring now to the drawings in detail, it will be seen that there is illustrated in Figures 1 through 4, inclusive, a preferred form of the invention, the blower being referred to in general by the reference numeral 10. It is to be understood that the blower 10 is to be mounted on a farm tractor in any desired manner and is to be interposed between a mechanical cotton picker carried by the tractor and an associated cotton carrier. Inasmuch as the mechanical cotton picker and the cotton carrier may be of any desired form and may vary as desired and still be used with the blower 10, no attempt is made to set forth the details of these two devices.

The blower 10 includes a generally cylindrical screen housing which is referred to in general by the reference numeral 12. The screen housing 12 includes a horizontally disposed, cylindrical body 14 which has one end thereof closed by a fixed wall 16. The other end of the cylindrical body 14 is closed by an adjustably mounted cover plate 18.

As is best illustrated in Figure 2, the cover plate 18 includes a peripheral annular flange 20 which fits around the outside of the adjacent portion of the body 14 to form a relatively tight seal therewith. The cover plate 18 is longitudinally adjusted with respect to the body 14 by suitable fasteners 22 which have opposite ends thereof oppositely threaded. Each of the fasteners 22 is provided at its center with a nut portion 24 to facilitate turning thereof. The opposite ends of the fasteners 22 are threaded into lugs 26 and 28 extending outwardly from the body 14 and the annular flange 20, respectively.

Rigidly secured to the wall 16, as at 30, and extending towards and through the cover plate 18 is a hollow shaft 32. Secured to the face of the cover plate 18 opposed to the wall 16 is a bearing assembly 34 in which the associated portion of the shaft 32 is journaled. Journaled on the shaft 32 adjacent the wall 16 is a bearing assembly 36. The shaft 32 is hollow and has in the end thereof adjacent the cover plate 18 a grease fitting 38 for facilitating the lubrication of the bearing assemblies 34 and 36.

The bearing assembly 36 serves to rotatably support a screen assembly which is referred to in general by the reference numeral 40. The screen assembly 40 includes a vertically disposed screen plate 42 which is rigidly secured to the bearing assembly 36 in such a manner so as to be disposed closely adjacent, but in spaced relation, to the wall 16. Secured to the screen plate 42 adjacent the periphery thereof is an annular body member 44 which projects towards and terminates closely adjacent the cover plate 18. Also secured to the screen plate 42 and projecting towards the cover plate 18, but disposed adjacent the center of the screen plate 42 and in concentric relation to the bearing assembly 36 is a tubular member 46. The tubular member 46 cooperates with a tubular member 48 carried by the cover plate 18 in concentric relation to the bearing assembly 34 to form a journal seal at the center of the screen assembly 40.

In order that the screen assembly 40 may be divided into a plurality of separate compartments, there are provided separator plates 50. The separator plates 50 extend between the tubular member 46 and the annular member 44 in radiating relation, as is best illustrated in Figure 1.

As is best illustrated in Figures 1 and 2, there is carried by the cover plate 18 and communicating with the interior of the housing 12 a lower cotton intake 52 and an upper cotton exhaust 54. In order that these two may not be communicated through the housing 12, there is carried by the cover plate 18 in radiating relation in the space between the cotton intake 52 and the cotton exhaust 54 a plurality of angle members 56 which are best illustrated in Figure 4. Carried by each of the angle members 56 is a flap 58 which engages the separator plates 50 as they rotate to form separate air passages about the cotton intake 52 and the cotton exhaust 54.

To facilitate the rotation of the screen assembly 40, there is provided at the periphery of the screen plate 42 a drive ring 60. The drive ring 60 has engaged with the major portion thereof a drive belt 62. The drive belt 62 also is entrained over a drive pulley 64 carried by a suitable mounting bracket 66. The drive pulley 64 is mounted on a drive shaft 68 which is connected in a manner not illustrated to the power take-off system of an associated tractor (not shown).

Secured to the wall 16 in opposite relation to the cover plate 18 is a fan housing 70. The fan housing 70 includes a generally horizontally disposed cylindrical body member 72 which is disposed in offcenter relation with respect to the body member 14. One end of the body member 72 is secured to the wall 16 and the opposite end thereof is closed by a wall 74. Disposed intermediate the walls 16 and 74 is a partition wall 76 dividing the housing 70 into compartments 75 and 77.

Extending longitudinally through the fan housing 70 and projecting outwardly thereof remote from the housing 12 is a shaft 78. The shaft 78 is provided with a suitable journal assembly 80 disposed outside the housing 70 and it is journaled in the bearing 82 carried by the partition wall 76. Carried on the end of the shaft 78 outside the compartment 75 of the fan housing 70 is a drive pulley 84 which may be connected to a power take-off assembly of an associated tractor (not shown). Mounted within the fan housing 70 between the walls 74 and 76 is a pressure fan 86. A suction fan 88 is mounted on the shaft 78 within the compartment 77 between the walls 16 and 76.

It is to be noted that the fan 88 and the compartment 77 are communicated with the interior of the housing 12 through an opening 90 in the wall 16 aligned with the cotton intake 52. Also communicating with the fan 88 and the compartment 77 and connected to the body member 72 is a transverse trash exhaust duct 92. Mounted in the trash exhaust duct 92 is an adjustable baffle 94. The opening 90, the compartment 77 and the trash exhaust duct 92 all combine to form a trash exhaust.

Extending upwardly from the top part of the body member 72 in alignment with the fan 86 is a pressure duct 96 which communicates the fan 86 and the compartment 75 with the upper part of the housing 12 in alignment with the cotton exhaust 54. The duct 96 is secured to the wall 16 in alignment with an opening 98 therethrough.

Secured to the wall 74 in alignment with an intake opening 100 therein is a hot air intake duct 102. The hot air intake duct 102 is intended to have its opposite end disposed adjacent the motor of an associated tractor (not shown) for receiving the hot air from the motor. In order that flow of hot air into the fan housing 70 may be controlled, there is provided an adjustable baffle 104 in the hot air intake duct 102 immediately adjacent the opening 100. The pressure duct 96, the compartment 75 and and the hot air intake duct 102 all combine to form a fresh air intake.

In the operation of the blower 100, cotton bolls, seed and trash or dirt are drawn into the housing 12 through the cotton intake 52 due to the suction action of the fan 88. This suction causes the cotton and seed to impinge against the screen plate 42 and be retained thereagainst by the suction of the fan 88. However, the suction from the fan 88 and the size of the openings of the screen plate 42 is such that the trash and dirt will pass through the screen plate 42 into the compartment 77 of the fan housing 70 between the walls 16 and 76. The trash and dirt is then blown out of the fan housing 70 by the fan 88 through the trash exhaust duct 92.

Inasmuch as the screen plate 42 is revolving at a slow rate, the cotton and seed impinged against the screen plate 42 will move upwardly into alignment with the opening 98 and the cotton exhaust 54. Inasmuch as the fan 86 creates a pressure in this portion of the screen housing 12, it will be seen that the cotton and seed carried by the screen plate 42 will be blown off the screen plate 42 and through the cotton exhaust 54. Since hot air from the tractor motor is being drawn in by the fan 86, it will be seen that the hot air will be sufficient to remove the excess moisture in the cotton which may be present at the time of picking. The amount of air may be varied through the use of the baffle 104 so as to permit a rigid control of the moisture content of the cotton, if desired.

Figure 6:
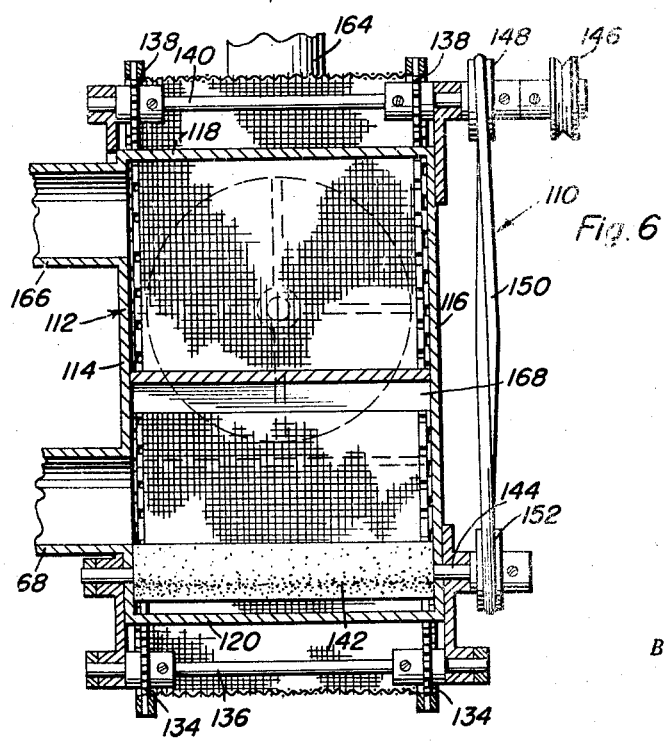
Figure 6 is a vertical sectional view taken substantially upon the plane indicated by the section line 6—6 of Figure 5 and shows further the details of the screen of the blower of Figure 5.

Referring now to Figures 5 and 6 in particular, it will be seen that there is illustrated a modified form of blower which is referred to in general by the reference numeral 110. The blower 110 includes a housing 112 having vertical side walls 114 and 116 which are connected together along their upper edges by a top wall 118 and along their lower edges by a bottom wall 120. The ends of the side walls 114 and 116 are also connected together by end walls 122 and 124, as is best illustrated in Figure 5.

Extending vertically through the housing 112 adjacent the end wall 124, but in spaced parallel relation with respect thereto is an operative portion of an endless screen 126. The screen 126 is carried by conveyor chains 128. The endless screen 126 and its associated conveyor chains 128 pass through aligned openings 130 and 132 in the top wall 118 and the bottom wall 120 of the housing 112, respectively. It is to be noted that the conveyor chains 128 are suitably journaled by a plurality of idler sprockets 134 mounted on idler shafts 136 mounted externally of the housing 112. The uppermost parts of the individual conveyor chains 128 are also entrained over a drive sprocket 138 carried by a drive shaft 140.

Mounted in the lower part of the housing 112 and in engagement with the side of the endless screen 126 disposed adjacent the wall 124 is a brush 142. The brush 142 is mounted on a shaft 144.

As is best illustrated in Figure 6, the drive shaft 140 has mounted on one outer end thereof a drive pulley 146. The drive pulley 146 is intended to have received thereon a belt (not shown) which may be conveniently connected to a tractor power take-off. Disposed immediately adjacent the drive pulley 146 is a pulley 148 which has entrained thereover a belt 150. The belt 150 has the lower part thereof entrained over a pulley 152 carried by the shaft 144 to rotate the brush 142. It is to be noted that the belt 150 is twisted so that the brush 142 rotates in a direction opposite from the direction of movement of the screen 126.

Referring once again to Figure 5 in particular, it will be seen that there is disposed within the housing 112 a horizontally disposed partition wall 154 which is disposed below the center of the housing 112. The left end of the partition wall 154 terminates closely adjacent the screen 126 and the opposite end thereof has connected thereto a vertical partition wall 156 depending from the top wall 118. The partition walls 154 and 156 divide the housing 112 into a suction area 158 and a pressure area 160. Connected to the rear wall 122 of the housing 112 is a hot air intake duct 162 which communicates with the pressure area 160. Connected to the top wall 118 is a trash exhaust duct 164 which is communicated with the suction area 158.

Also connected to the housing 112 is an upper cotton intake 166 and a lower cotton exhaust 168. The cotton intake 166 and the cotton exhaust 168 are secured to the side wall 114 between the wall 124 and the screen 126 in the relationship best illustrated in Figure 5.

Secured to the inner face of the end wall 124 is a horizontal divider plate 170 which has hingedly secured thereto for adjustment a flow control door 172 which controls the flow of cotton between the upper part of the area bounded by the walls 118, 120, 124, 114 and 116 and the screen 126 to the lower part thereof.

Suitably mounted externally of the housing 112 is a journal assembly 174 which has rotatably mounted therein a shaft 176. Also carried by the partition walls 154 and 156 is a journal assembly 178 in which the portion of the shaft 176 disposed within the housing 112 is suitably journaled. The end of the shaft 176 disposed adjacent the journal assembly 174 has mounted thereon a pulley 180 which is intended to have connected thereto suitable drive belts from a power take-off of an associated tractor (not shown).

Mounted on the left hand end of the shaft 176, as viewed in Figure 5, is a suction fan 182 which is mounted in the suction area 158. Mounted in the pressure area 160 is a pressure fan 184, the pressure fan 184 being generally in alignment with the connection between the hot air intake duct 162 and the end wall 122. It is to be understood that the fans 182 and 184 are disposed in the upper part of the housing 112.

In the operation of the blower 110, both fans 182 and 184 are driven simultaneously with the fan 182 causing a suction so as to draw cotton from a cotton picking machine (not shown) into the housing 112 through the cotton intake 166. Inasmuch as there is a suction in that part of the housing 112 into which the cotton enters, the cotton is impinged against the screen 126. However, the screen 126 is of a size whereby dirt and small trash carried in with the cotton from the picking operation will be drawn through the screen 126 and blown out through the trash exhaust duct 164 by the fan 182. Inasmuch as the screen 126 is suitably driven to move downwardly, as viewed in Figure 5, the cotton carried by the screen will move downwardly at a rate controlled by the gate 172. Inasmuch as a major portion of the housing aligned with the screen 126 below the gate 172 is a pressure area, it will be seen that the cotton carried by the screen 126 will be blown away therefrom and out through the cotton exhaust 168. Inasmuch as warm air under control conditions may pass through the housing 112 in the blowing of the cotton off the screen 126, it will be seen that the moisture of the cotton may be controlled as desired so as to condition the cotton. The brush 126 assures that all cotton and seed is removed from the screen 126.

The terms suction and pressure as used hereinabove are relative to atmospheric pressure which is considered to be normal.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A cotton cleaning blower for use in combination with a mechanical cotton picker, said blower comprising a housing, a circular screen, means mounting said screen in said housing for rotation, a cotton intake and a cotton exhaust connected on one side of said housing in spaced relation, said cotton intake and said cotton exhaust communicating with the interior of said housing and opening thereinto normal to said screen, a trash exhaust connected to said housing and communicating with the interior of said housing in opposed alignment with said cotton inlet, a fresh air intake connected to said housing and communicating with the interior of said housing in opposed alignment with said cotton exhaust, means for producing a suction in said cotton intake, a portion of said trash exhaust and an aligned portion of said screen, means for producing a pressure in a portion of said air intake, said cotton exhaust and an aligned portion of said screen, means for dividing said screen into a plurality of sections individually sealed relative to said housing whereby the first and second mentioned screen portions are separated from each other.

2. A cotton cleaning blower for use in combination with a mechanical cotton picker of the type including an internal combustion engine, said blower comprising a housing, a circular screen, means mounting said screen in said housing for rotation, a cotton intake and a cotton exhaust connected on one side of said housing in spaced relation, said cotton intake and said cotton exhaust communicating with the interior of said housing and opening thereinto normal to said screen, a trash exhaust connected to said housing and communicating with the interior of said housing in opposed alignment with said cotton inlet, a fresh air intake connected to said housing and communicating with the interior of said housing in opposed alignment with said cotton exhaust, means for producing a suction in said cotton intake, a portion of said trash exhaust and an aligned portion of said screen, means for producing a pressure in a portion of said air intake, said cotton exhaust and an aligned portion of said screen, means for dividing said screen into a plurality of sections individually sealed relative to said housing whereby the first and second mentioned screen portions are separated from each other, means for connecting said fresh air intake to a source of heat from the internal combustion engine whereby the fresh air is heated.

3. A cotton cleaning blower for use in combination with a mechanical cotton picker, said blower comprising a housing, a circular screen, means mounting said screen in said housing for rotation, a cotton intake and a cotton exhaust connected on one side of said housing in spaced relation, said cotton intake and said cotton exhaust communicating with the interior of said housing and opening thereinto normal to said screen, a trash exhaust connected to said housing and communicating with the interior of said housing in opposed alignment with said cotton inlet, a fresh air intake connected to said housing and communicating with the interior of said housing in opposed alignment with said cotton exhaust, means for producing a suction in said cotton intake, a portion of said trash exhaust and an aligned portion of said screen, means for producing a pressure in a portion of said air intake, said cotton exhaust and an aligned portion of said screen, means for dividing said screen into a plurality of sections individually sealed relative to said housing whereby the first and second mentioned screen portions are separated from each other, said suction producing means and said pressure producing means being in the form of fans mounted on a common shaft.

4. A cotton cleaning blower for use in combination with a mechanical cotton picker, said blower comprising a housing, a circular screen, means mounting said screen in said housing for rotation, a cotton intake and a cotton exhaust connected on one side of said housing in spaced relation, said cotton intake and said cotton exhaust communicating with the interior of said housing and opening thereinto normal to said screen, a trash exhaust connected to said housing and communicating with the interior of said housing in opposed alignment with said cotton inlet, a fresh air intake connected to said housing and communicating with the interior of said housing in opposed alignment with said cotton exhaust, means for producing a suction in said cotton intake, a portion of said trash exhaust and an aligned portion of said screen, means for producing a pressure in a portion of said air intake, said cotton exhaust and an aligned portion of said screen, means for dividing said screen into a plurality of sections individually sealed relative to said housing whereby the first and second mentioned screen portions are separated from each other, said suction producing means and said pressure producing means being in the form of fans mounted on a common shaft, one of said fans being mounted in said trash exhaust, the other of said fans being mounted in said fresh air intake.

5. A cotton cleaning blower for use in combination with a mechanical cotton picker, said blower comprising a housing, a circular screen, means mounting said screen in said housing for rotation, a cotton intake and a cotton exhaust connected on one side of said housing in spaced relation, said cotton intake and said cotton exhaust communicating with the interior of said housing and opening thereinto normal to said screen, a trash exhaust connected to said housing and communicating with the interior of said housing in opposed alignment with said cotton inlet, a fresh air intake connected to said housing and communicating with the interior of said housing in opposed alignment with said cotton exhaust, means for producing a suction in said cotton intake, a portion of said trash exhaust and an aligned portion of said screen, means for producing a pressure in a portion of said air intake, said cotton exhaust and an aligned portion of said screen, means for dividing said screen into a plurality of sections individually sealed relative to said housing whereby the first and second mentioned screen portions are separated from each other, said suction producing means being in the form of a fan disposed in said trash exhaust, said pressure producing means including a second fan mounted in said fresh air intake.

References Cited in the file of this patent
UNITED STATES PATENTS

| | | |
|---|---|---|
| 1,026,432 | Dey | May 14, 1912 |
| 1,707,930 | Bennett | Apr. 2, 1929 |
| 2,301,350 | Whitfield | Nov. 10, 1942 |
| 2,339,295 | Rust | Jan. 18, 1944 |
| 2,686,084 | Baldwin | Aug. 10, 1954 |